(12) United States Patent
Lynch

(10) Patent No.: US 6,668,256 B1
(45) Date of Patent: Dec. 23, 2003

(54) ALGORITHM FOR AUTOMATIC SELECTION OF DISCRIMINANT TERM COMBINATIONS FOR DOCUMENT CATEGORIZATION

(75) Inventor: Michael Richard Lynch, Royston (GB)

(73) Assignee: Autonomy Corporation Ltd, Cambridge (GB)

( * ) Notice: Subject to any disclaimer, the term of this patent is extended or adjusted under 35 U.S.C. 154(b) by 428 days.

(21) Appl. No.: 09/765,804

(22) Filed: Jan. 19, 2001

Related U.S. Application Data

(60) Provisional application No. 60/176,986, filed on Jan. 19, 2000.

(51) Int. Cl.[7] .............................................. G06F 17/30
(52) U.S. Cl. ........................ 707/101; 707/100; 707/104
(58) Field of Search ................................ 707/101, 100, 707/104, 2, 5, 3; 382/225

(56) References Cited

U.S. PATENT DOCUMENTS

| | | | |
|---|---|---|---|
| 6,006,221 A | * 12/1999 | Liddy et al. | ..................... 707/5 |
| 6,137,911 A | * 10/2000 | Zhilyaev | ...................... 382/225 |
| 6,477,524 B1 | * 11/2002 | Taskiran et al. | ................ 707/2 |
| 6,523,026 B1 | * 2/2003 | Gillis | ............................. 707/3 |

OTHER PUBLICATIONS

Autonomy, Technology White Paper, Sep. 1997, pp. 1–17.
Autonomy, Technology White Paper, Nov. 2000, pp. 1–9.
Autonomy—Adding Intelligence to the XML, Nov. 2000, pp. 1–3.
Autonomy, First to Fully Automate XML Tagging, Jun. 1998, pp. 1–2.
P.J. Rayner and M.R. Lynch, ICASSP 90 volume 2 $S_2$ VA, Speech Processing 2 VLSI Audio and Electroacoustics, Complexity Reduction in Volterra Connectionist Modelling by Consideration of Output Mapping, Apr. 3–6, 1990, pp. 885–888.
M.R. Lynch, P.J. Rayner and S.B. Holden, ICASSP 91 vol. 3D, Digital Signal Processing, Removal of Degeneracy in Adaptive Volterra Networks by Dynamic Structuring, May 14–17, 1991, pp. 2069–2072.
Haykin, S., *Adaptive Filter Theory*, Englewood Cliffs, N.J.: Prentice–Hall, 1986, Chapter 5 and 8.
Ivankhnenko, A. "Heuristic Self–Organization Problems of Engineering Cybernetics Automatica," vol. 6, Mar., 1970, pp. 207–219.
Klema, V., et al., "The Singular Valve Decomposition: Its Computation and Some Applications," IEEE Trans. AC, vol. AC–25, No. 2, Apr. 1980, pp. 164–176.
Powell, M.J.D., *Radial Basis Function Approximations to Polynomials*, Proc. Department of Applied Mathematics and Theoretical Physics, *Numerical Analysis*, 1987.
Rayner, P. et al., "A New Connectionist Model Based on a Non–Linear Adaptive Filer Process," ICASSP89, Apr., 1989.
Schetzen, Martin, *The Volterra and Weiner Theories on Non–Linear Systems*, New York, New York: John Wiley, 1980, Chapter 5.
Xue, Q., et al., "Analysis of the Hidden Units of the Multi–Layer Preceptron and its Application in Acoustic–To–Articulatory Mapping," Proc. ICASSP90, Apr. 1990.

* cited by examiner

*Primary Examiner*—Sanjiv Shah
(74) *Attorney, Agent, or Firm*—Blakely, Sokoloff, Taylor & Zafman LLP

(57) ABSTRACT

A method and apparatus for document categorization are described. In one embodiment, the method comprises automatically selecting one or more discriminant term combinations and using the one or more discriminant term combinations for document categorization.

19 Claims, 3 Drawing Sheets

ALGORITHM FOR AUTOMATIC SELECTION OF DISCRIMINANT TERM COMBINATIONS FOR DOCUMENT CATEGORIZATION

This application claims the benefit of U.S. Provisional Application No. 60/176,986 entitled "An Algorithm for Automatic Selection of Discriminant Term Combinations for Document Categorization," filed Jan. 19, 2000.

BACKGROUND OF THE INVENTION

A general problem that arises in many systems for automating the handling of documents is the need to assign a particular document to a class or category dependent on the subject matter discussed in its content.

Most commercial systems for achieving this rely on a human creating lists of terms which are used to categorize the document. That is, if the terms appear in a document, then this fact is taken as evidence that the document should be assigned to a particular category. Such approaches are inaccurate and require a lot of manual work in setting up and maintaining the term lists and associated boolean operator combinations.

There is need for accurate, self-maintaining and automatically created categorization systems.

Although there have been attempts to create self structuring in other fields these have usually been at the expense of unimodality and have required adaptation algorithms of very high computational loads such as simulated annealing to remove even the simplest redundancies. See Qiuzhen Xue, Yu Hen Hu & Paul Milenkovic, Analysis of the hidden units of the multi-layer preceptron and its application in acoustic-to-articulatory mapping. Proc. ICASSP90 April 1990. Other singular value decomposition (SVD) approaches have been applied but have only removed a subset of the redundant terms. See Schetzen, The Volterra and Weiner Theories of Non-linear systems New York, N.Y.: John Wiley 1980. These methods utilise SVD to reduce the recognition space to a more compact form by use of the singular values.

REFERENCES (1) P. Rayner & M. R. Lynch, a new connectionist model based on a non-linear adaptive filter proc. ICASSP89 April 1989
(2) M. J. D. Powell, Radial Basis Function approximations to polynomials Proc. Department of applied mathematics and theoretical Physics.
(3) A. Ivankhnenko, Heuristic self-organisation problems of engineering cybernetics automatica. Vol 6. 1970, pp.207–209
(4) Qiuzhen Xue, Yu Hen Hu & Paul Milenkovic, Analysis of the hidden units of the multi-layer preceptron and its application in acoustic-to-articulatory mapping. Proc. ICASSP90 April 1990
(5) Schetzen, The Volterra and Weiner Theories of Non-linear systems New York, N.Y.: John Wiley 1980.
(6) S. Haykin, Adaptive Filter Theroy Englewood Cliffs, N.J.: Prentice-Hall 1986
(7) V. Klema & A. Laub, The singular Valve Decomposition: Its computation and some applications. IEEE Trans. AC,vol. AC-25, No 2. April 1980, pp 164–176

SUMMARY OF THE INVENTION

A method and apparatus for document categorization are described. In one embodiment, the method comprises automatically selecting one or more discriminant term combinations and using the one or more discriminant term combinations for document categorization.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
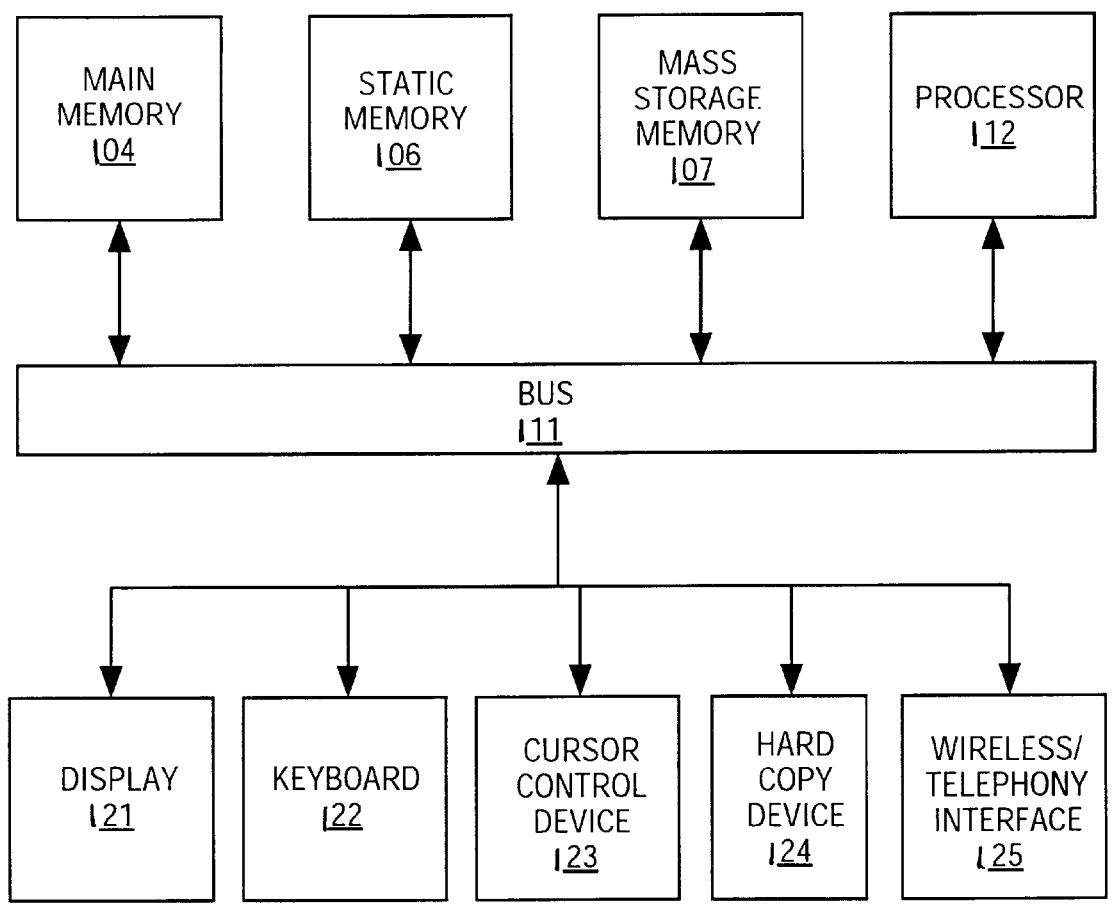
FIG. 1 is a block diagram of an exemplary computer system.

A method and apparatus for automatically selecting discriminant term combinations for document categorization are described. This is performed by allowing automatic determination of terms, combinations of terms and concepts. Using these, a system has the ability to automatically identify and remove less helpful terms, term combinations and concepts from processing and, thus, allow them to be replaced by more useful ones. Such an approach may be referred to as pattern based automatic term pruning.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview of a Pattern-based Approach

Figure 2:
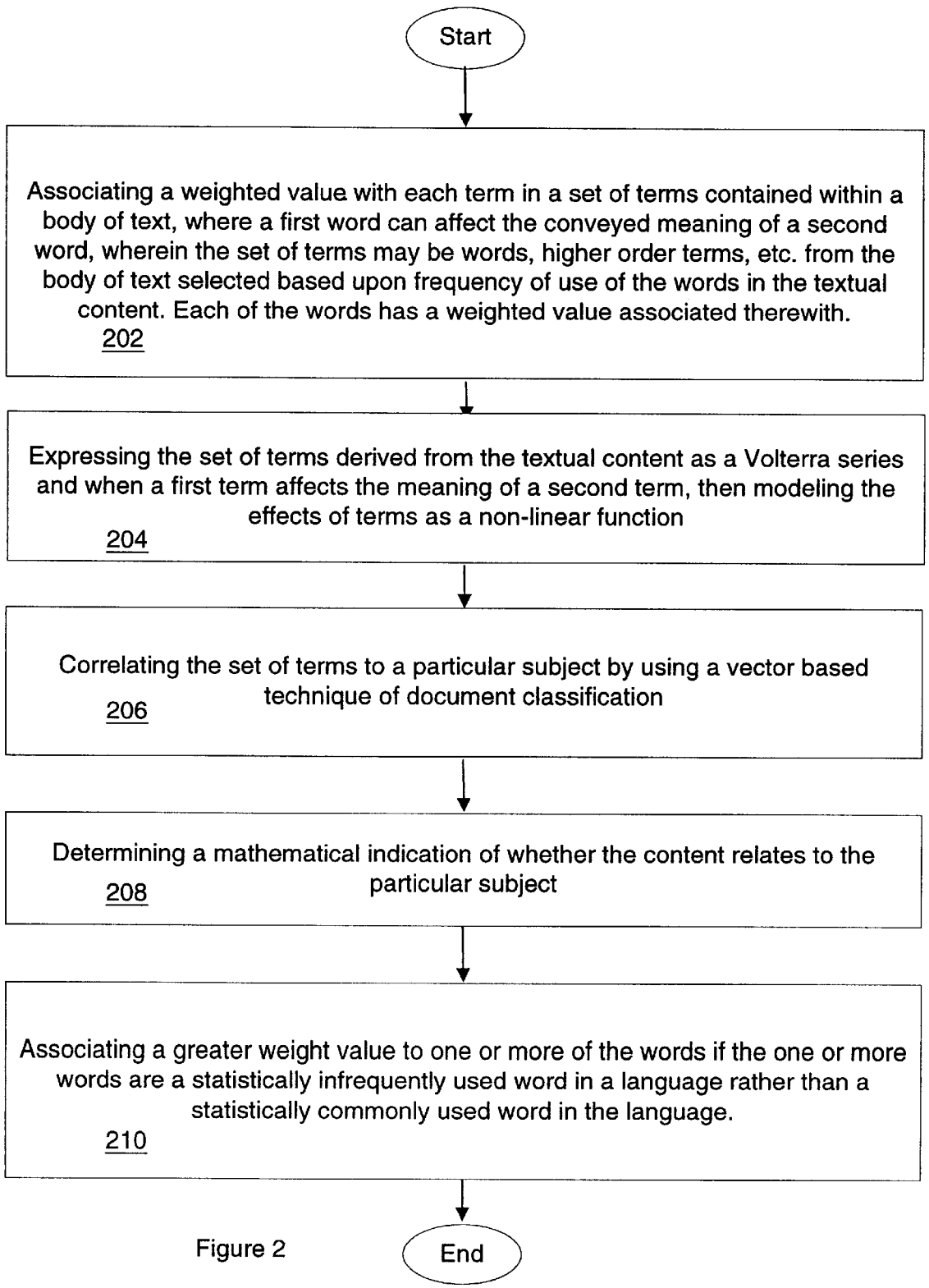
FIG. 2 illustrates a flow diagram of an embodiment of an algorithm to determine a mathematical indication of whether textual content relates to a particular subject.

FIG. 2 illustrates a flow diagram of an embodiment of an algorithm to determine a mathematical indication of whether textual content relates to a particular subject.

Documents as vectors

One way of posing the problem is to consider information in the document in a high dimensional space, each dimension of which is associated with a term from the corpus (the total group of documents). A document can be represented in this space as a point the coordinates of which arise from the presence or absence of each of the corpus terms in the particular document. This leads to a very high dimensionality space as there are many tens of thousand of terms in a practical corpus. In practice, it is not necessary to use all the terms from a corpus as many terms such as 'the' are so common as to lend little to the solution of the problem. Typically schemes operate on the rarer words present in a document on the term infrequency basis; that is, rarer words are more likely to carry the meaning of the document. It is only these rarer terms that are used. Various other ad hoc term selection schemes may be used.

On this basis, a document can be classified by looking at the distance in this space between the point representing the document and the point representing the nearest category. This is commonly referred to as the vector-based technique of document classification.

Higher Order Terms

Often it is not individual terms that convey meaning but combinations of these. Often one term acts as a qualifier and changes the meaning of another term present. For example the term 'cat' with no a prori information is probably something to do with felines; however in the presence of the term 'burglar' its meaning in effect changes. Such combinations can be thought of as higher order terms.

Using * to denote an operator, such a combination of terms for a document such as "the dog, the cat and the burglar"

may be represented based on order as:

$1^{st}$ order 'cat','dog','burglar'
$2^{nd}$ order 'cat*dog','cat*burglar','burglar*dog'
$3^{rd}$ order 'cat*burglar*dog'

With a reasonable number of terms, it is clear the number of higher order terms can explode rapidly.

Concepts and Terms

The concept of higher order terms may be efficiently extended by, rather than operating on, all higher order combinations, grouping higher order terms into concepts and then defining these concepts as new terms in the process in their own right. Whilst being efficient, identification of these concepts is non-trivial. For example, if a new concept term A1='Cat*burglar' is considered, then the higher order mixed term A1*'police' may be found to be useful.

Conceptually, the problem is one of theoretically starting with all terms, generating higher order terms and selecting only those for the classifiers which contribute most to accurate results. Such an approach is an example of self-structured pruning of the recognition space.

The representation of weighted terms and higher order terms can be expressed as a Volterra series.

An Exemplary Algorithm

Figure 3:
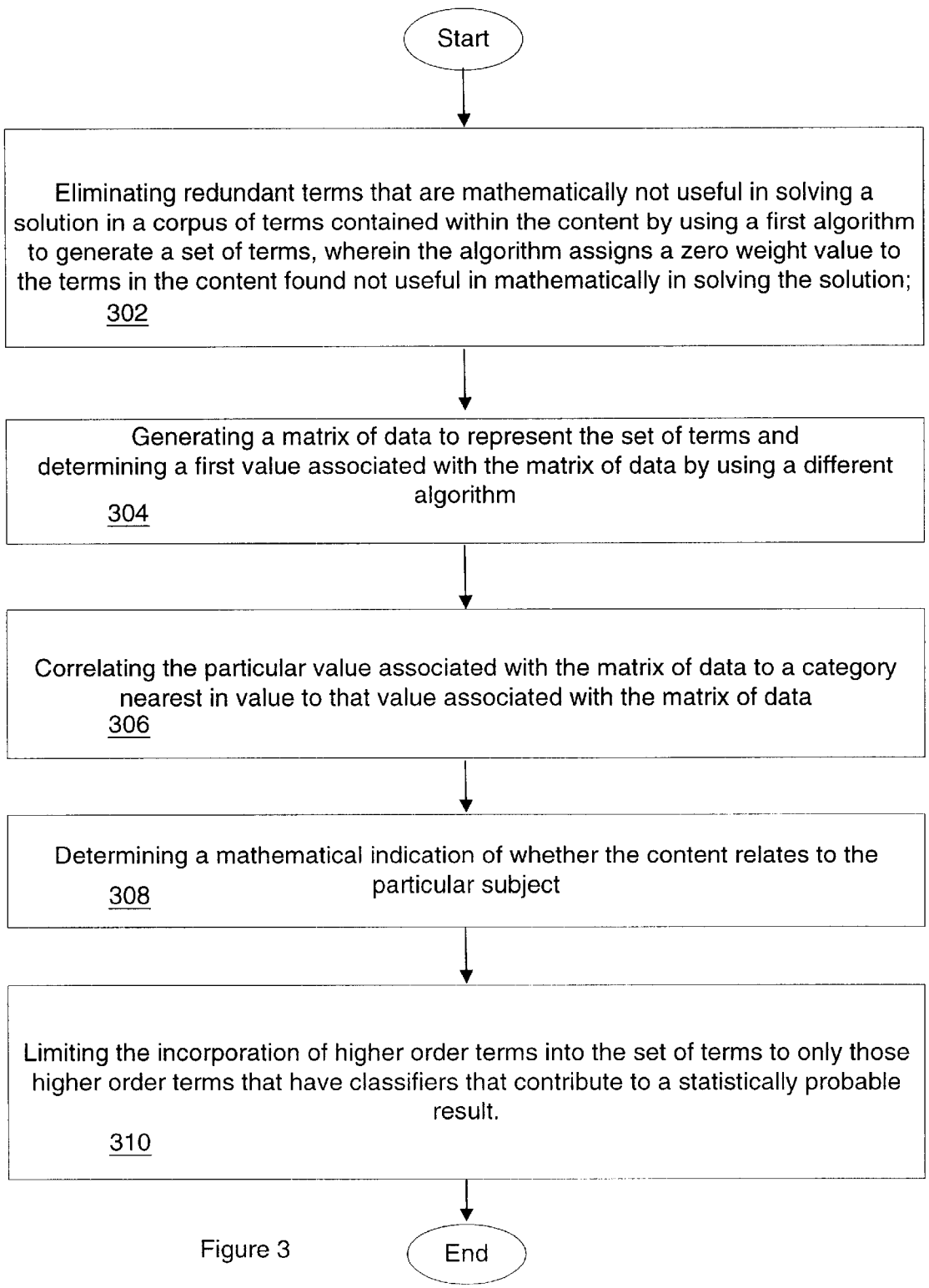
FIG. 3 illustrates a flow diagram of an embodiment of an algorithm to identify and remove redundant terms not mathematically useful in solving a solution.

FIG. 3 illustrates a flow diagram of an embodiment of an algorithm to identify and remove redundant terms not mathematically useful in solving a solution.

In adaptive term modeling, it is important to eliminate the need for a priori information, as the non-linear relationships necessary to perform many of the problems addressed are too complex in general to be adequately described explicitly.

In one embodiment, a model is created, which is as general as possible which increases and potentially optimizes, its performance through the adaptive process on training data to remove problem specific structural redundancies in the network structure in order to reduce computational load.

In order to perform a general transfer function, a very large number of terms from the Volterra series may be needed. Experience has shown that many real problems may however be solved with limited order networks of order one or two. It has also become apparent that it is very difficult to predict in advance which terms will be irrelevant and remove them. Thus, the problem is to identify the redundant terms and remove them and so restructure the network.

Linear Weight Networks

They are composed of a non-linear expansion operation on the input document vector x to give an extended space data vector v containing higher order terms and concepts. This may be represented below as:

$$v=F(x)$$

with F(x) being the non-linear space extending function. In the volterra case, the vector may be written in the form of a polynomial expansion, such as follows:

$$v^t=(1,x_1,x_2,x_1x_2,x^2_1,x^2_2,x^2_1x_2,\ldots)$$

A weighted linear sum using a set of weights w is then performed in the extended space to give the output y, which may be subtracted from the desired output d to give an error $\epsilon$ as follows:

$$\epsilon=d-y=d-w^t v$$

It can be shown that the mean square error is:

$$E[\epsilon^2]=E[(d-w^t v)^2]=\sigma^2-2w^t p+w^t Rw$$

where R is the autocorrelation matrix of the data in the non-linearly extended vector space, similarly P is the crosscorrelation vector between the desired d signal and the non-linearly expanded data, and $\sigma^2$ is the variance of the desired response.

In general for the pattern recognition problem in which the network is performing well, the network is degenerate or rank-deficient. That is, R is singular or near singular.

A single solution may still be obtained by the application of Singular Value Decomposition theorem, which states: For matrix A of rank q, there are two unitary matrices X and Y such that:
where:

$$Y^H A X = \begin{pmatrix} \Sigma & 0 \\ 0 & 0 \end{pmatrix}$$

and:

$$\Sigma q = \mathrm{diag}(\sigma_1, \sigma_2, \ldots, \sigma_q)$$

$$\sigma_1 \geq \sigma_2 \geq \ldots \geq \sigma_q > 0$$

This theorem can be used to solve for the weight vector even when R is singular. More generally, the weight equation may be rewritten:

$$w = A^m b$$

where $A^m$ is the Moore-Penrose generalized inverse or pseudoinverse of matrix A. Singular Value Decomposition can give a unique solution to the equation, giving the one solution with the minimum-norm.

$$A^m = X \begin{pmatrix} \Sigma^{-1} & 0 \\ 0 & 0 \end{pmatrix} Y^H$$

where:

$$\Sigma^{-1} = \mathrm{diag}(\sigma_1^{-1}, \sigma_2^{-1}, \ldots, \sigma_q^{-1})$$

and q is the rank of the matrix A. It is shown that $$A^m = \sum_{i=1}^{q} \frac{x_i}{\sigma_i^2} x_i^H A^H b$$

The equation may be used by first computing the singular values of the data matrix A and the associated singular vectors $x_1 \ldots x_q$ and substituting them into the above equation to give w. This gives a numerically well behaved method, which may even be used for rank deficient systems. In minimizing the norm coefficients, which proceed the irrelevant terms, they will be set to zero coefficients and may be removed. This may be defined as Type I redundancy.

Self Structuring by Type II Redundancy Removal

A novel term selection method is described below which allows for finding weight vectors containing at most q non-zero weights where q is the rank of R. Let N(R) and R(R) be the nullspace and range of R respectively. Consider choosing a weight vector w for a standard Volterra Connectionist Model (VCM) for which, $$Rw = p$$

where R is an n×n symmetric matrix of rank q<n and p∈R(R) such that there are an infinite number of possible solutions. The standard algebraic technique of changing R into an echelon matrix, shows that there are (n−q) weights which can be set arbitrarily, the remaining weights being determined in terms of the actual values used.

Setting the arbitrary weights to zero and the remaining weights according gives a valid solution of an appropriate solution is gained using the SVD of R. As R is symmetric, $$R = [Y_1 Y_2] \Sigma X^t \quad (1)$$

where the columns of $Y_1$ correspond to the q non-zero singular values and span R(R) and the columns of $Y_2$ correspond to the (n−q) zero singular values and span N(R). If $\{u_i\}$ are the columns of $Y_2$ and $w_{min}$ is the minimum norm solution of (1) then the general solution is, $$\tilde{w} = w_{min} + \sum_{i=1}^{(n-q)} a_i u_i \quad (2)$$

for arbitrary real numbers $a_i$. As (n−q) weights are arbitrary it is always possible to construct a set of equations, for which a solution exists, of the form, $$\begin{pmatrix} - & u_2^{(1)} & - \\ - & u_2^{(2)} & - \\ & \vdots & \\ - & u_2^{(n-q)} & - \end{pmatrix} \begin{pmatrix} a_1 \\ a_2 \\ \vdots \\ a_{n-q} \end{pmatrix} = - \begin{pmatrix} w'_1 \\ w'_2 \\ \vdots \\ w'_{n-q} \end{pmatrix} \quad (3)$$

where $\{u_2^{(i)}\}$ is a subset of the rows of $Y_2$ and $\{w'_i\}$ are the corresponding weights in $w_{min}$. Substituting the solution in equation (2) above yields a weight vector $\tilde{w}$ with at least (n−q) zero weights. In practice, it is found that settings (n−q) weights to zero may cause other weights also to be set to zero, thereby further simplifying the VCM. As weights are being removed by canceling them using null vectors, the corresponding non-linearities are called Inherent Nullspace Non-linearities. These Inherent Nullspace Non-linearities are an example of Type II redundancies.

In constructing (3), the columns of Y corresponding to strictly zero singular values were used. In practice, it is generally found that at least one singular value is close to but not equal to zero.

As it was assumed that equation (1) has a solution the VCM has a mean square error of $J = E[\epsilon^2]$, and it is interesting to see how this is affected if the columns of Y corresponding to non-zero singular values are used in calculating using (2) and (3). In this case, $$\tilde{w} = w_{min} + \sum_{i=1}^{(n-q)} a_i u_i + \sum_{i=1}^{k} b_i u_i$$

where k vectors $\{u'_i\}$ corresponding to non-zero singular values $\{\sigma_i\}$ are selected. It is easy to show that, if the new set of equations of the form of (3) has a solution, then the new mean square error J' is, $$J' = J + \sum_{i=1}^{k} b_i^2 \sigma_i$$

An algorithm using the above method can be used to successfully remove Type II redundancy.

The Type I Case

For a simple example, a two pattern problem is addressed. A second order extention is used:

$$y = w_0 1 + w_1 x_1 + w_2 x_2 + w_3 x_1 x_2$$

The patterns are alternately presented and the smallest coefficient after 50 presentations is shown:

Indices of −2 and 1 were used except for the fourth run in which −1 and 1 were used.

| Pattern 1 | Pattern 2 | Redundancy | Eliminated Weight |
|---|---|---|---|
| (2, −1) | (−1, 2) | $x_1 x_2$ | $w_3$ |
| (2, −1) | (−2, −1) | $x_2$ | $w_2$ |
| (2, −1) | (2, 2) | $x_1$ | $w_1$ |
| (2, −1) | (−3, 2) | 1 | $w_0$ |

The results demonstrate that the network correctly eliminates unnecessary terms and so can solve a problem with a smaller network.

The Type II Case

This demonstrates, using a simple example, that the removal of Type Is is not necessarily equivalent to the removal of Type IIs. Consider training a two input VCM with second order extension and no output mapping to output 1 when the input vector is either $$\text{or } x_1^t = \left( \frac{1}{\sqrt{2}} \quad \frac{1}{\sqrt{2}} \right) \quad x_2^t = \left( \frac{-1}{\sqrt{2}} \quad \frac{-1}{\sqrt{2}} \right)$$

Only two training examples, $x_1$, and $x_2$, are used. Under these circumstances, two obvious models for data are available. Firstly, a circle of radius 1, and secondly, a line through the training points and the origin (see FIG. 2). The extended input vector is of the form, $$x^t = (1 x_1 x_2 x_1^2 x_1 x_2 x_2^2)$$

The minimum norm solution in this case is, $$w'_{min} = (0.57 \ 0 \ 0 \ 0.29 \ 0.29 \ 0.29)$$

and thus has four non-zero weights. Removal of Type IIs leads to weight vector, $$w_{INN}{}' = (0 \ 0 \ 0 \ 0 \ 1 \ 1)$$

which has only two non-zero weights and thus gives a simpler model than that obtained using the minimum norm solution. In this case the simplest possible solution, which has only a single weight, has not been found. In practice it is found that there may be more than one way of setting (n−q) weights to zero in some problems and it is suggested that in this case an alternative solution exists, which was not found by the current algorithm, which allows more than (n−q) weights to be set to zero as explained in section entitled Self-Structuring by Type II Redundancy Removal.

An Exemplary Computer System

FIG. 1 is a block diagram of an exemplary computer system that may be used to perform one or more of the functions described herein. Referring to FIG. 1, computer system 100 may comprise an exemplary client 150 or server 100 computer system. Computer system 100 comprises a communication mechanism or bus 111 for communicating information, and a processor 112 coupled with bus 111 for processing information. Processor 112 includes a microprocessor, but is not limited to a microprocessor, such as, for example, Pentium™, PowerPC™, Alpha™, etc.

System 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor 112.

Computer system 100 also comprises a read only memory (ROM) and/or other static storage device 106 coupled to bus 111 for storing static information and instructions for processor 112, and a data storage device 107, such as a magnetic disk or optical disk and its corresponding disk drive. Data storage device 107 is coupled to bus 111 for storing information and instructions.

Computer system 100 may further be coupled to a display device 121, such as a cathode ray tube (CRT) or liquid crystal display (LCD), coupled to bus 111 for displaying information to a computer user. An alphanumeric input device 122, including alphanumeric and other keys, may also be coupled to bus 111 for communicating information and command selections to processor 112. An additional user input device is cursor control 123, such as a mouse, trackball, trackpad, stylus, or cursor direction keys, coupled to bus 111 for communicating direction information and command selections to processor 112, and for controlling cursor movement on display 121.

Another device that may be coupled to bus 111 is hard copy device 124, which may be used for printing instructions, data, or other information on a medium such as paper, film, or similar types of media. Furthermore, a sound recording and playback device, such as a speaker and/or microphone may optionally be coupled to bus 111 for audio interfacing with computer Sets system 100. Another device that may be coupled to bus 111 is a wired/wireless communication capability 125 to communication to a phone or handheld palm device.

Note that any or all of the components of system 100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method, comprising:
   associating a weighted value with each term in a set of terms contained within textual content, where a first word can affect the conveyed meaning of a second word;
   expressing the set of terms derived from the textual content as a Volterra series;
   correlating the set of terms to a particular subject by using a vector based technique of document classification; and
   determining a mathematical indication of whether the content relates to the particular subject.

2. The method of claim 1, wherein the set of terms comprises words from the content selected based upon frequency of use of the words in the textual content, each of the words having a weighted value associated therewith.

3. The method of claim 2, further comprising:

associating a greater weight value to a first word if the first word is a statistically infrequently used word in a language rather than a statistically commonly used word in the language.

4. The method of claim 1, wherein the set of terms includes higher order terms.

5. The method of claim 1, further comprising:

determining a first set of values associated with the matrix of data by using a second algorithm, wherein the set of weighted values includes three or more values; and correlating the first set of values associated with the matrix of data to a category nearest in value to the first set of values associated with the matrix of data.

6. The method of claim 1, further comprising:

modeling effects of terms as a non-linear function when a first term affects the meaning of a second term.

7. A method, comprising:

eliminating terms mathematically not useful in solving a solution in a corpus of terms contained in a body of text by using a first algorithm to generate a set of terms, wherein the algorithm assigns a zero weight value to the terms in the body of the text found not useful in mathematically in solving the solution;

generating a matrix of data to represent the set of terms;

determining a first value associated with the matrix of data by using a second algorithm;

correlating the first value associated with the matrix of data to a category nearest in value to the first value associated with the matrix of data; and determining a mathematical indication of whether the content relates to a particular subject.

8. The method of claim 7, wherein the eliminating redundant terms comprises:

comparing words in the content to common grammatical terms contained in a list, and removing from the corpus of terms any word that matches one or more of the common grammatical terms contained in the list.

9. The method of claim 7, further comprising:

limiting the incorporation of higher order terms into the set of terms to only those higher order terms that have classifiers that contribute to a statistically probable result.

10. The method of claim 7, further comprising:

modeling effects of terms as a non-linear function when a first term affects the meaning of a second term.

11. The method of claim 7, further comprising:

expressing the set of terms as a Volterra series.

12. An apparatus, comprising:

a software engine containing a plurality of modules;

a first module to identify and remove terms mathematically not useful in solving a solution in a corpus of terms contained in a body of text by using a first algorithm to generate a set of terms, wherein the algorithm assigns a zero weight value to the terms in the body of the text found not useful in mathematically in solving the solution;

a second module to generate a matrix of data to represent the set of terms;

a third module to use an algorithm in order to determine a first value associated with the matrix of data;

a fourth module to correlate the first value assigned to the matrix of data to a category nearest in value to the first value associated with the matrix of data; and a fifth module to determine a mathematical of whether the content relates to a particular subject.

13. The apparatus of claim 12, further comprising:

a sixth module to limit the incorporation of higher order terms into the set of terms to only those higher order terms that have classifiers that contribute to a statistically probable result.

14. The apparatus of claim 13, wherein the first value associated with the matrix of data includes an extended space value associated with the higher order terms that have classifiers that contribute to a statistically probable result.

15. The apparatus of claim 13, further comprising:

a sixth module to model effects of terms as a non-linear function when a first term affects the meaning of a second term.

16. The apparatus of claim 13, further comprising:

a sixth module to express the set of terms as a Volterra series.

17. A method, comprising:

associating a weighted value with each term in a set of terms contained within content, where a first word can affect the conveyed meaning of a second word;

expressing the set of terms as a Volterra series, wherein the set of terms comprises words from the content selected based upon frequency of use of the words in the content, each of the words having a weighted value associated therewith;

correlating the set of terms to a particular subject by using a vector based technique of document classification;

determining a probability indication of whether the content relates to the particular subject; and associating a greater weight value to a statistically infrequently used word in a language rather than a statistically commonly used word in the language.

18. An apparatus, comprising:

a software engine containing a plurality of modules;

a first module to identify and remove redundant terms in a corpus of terms contained within content in order to create a set of terms;

a second module to generate a matrix of data to represent the set of terms;

a third module to use an algorithm in order to determine a first value associated with the matrix of data;

a fourth module to correlate the first value assigned to the matrix of data to a category nearest in value to the first value associated with the matrix of data;

a fifth module to determine a probability of whether the content relates to a particular subject; and a sixth module to limit the incorporation of higher order terms into the set of terms to only those higher order terms that have classifiers that contribute to a statistically probable result.

19. A method comprising:

eliminating redundant terms in corpus of terms contained within content by using a first algorithm to generate a set of terms;

limiting the incorporation of higher order terms into the set of terms to only those higher order terms that have classifiers that contribute to a statistically probable result;

generating a matrix of data to represent the set of terms;

determining a first value associated with the matrix of data by using a second algorithm;

correlating the first value associated with the matrix of data to a category nearest in value to the first value associated with the matrix of data; and determining a probability indication of whether the content relates to a particular subject.

* * * * *